Feb. 28, 1956   L. W. VINAL   2,736,609
BRISTLE FEEDING AND CUTTING MACHINE
Filed Oct. 4, 1950   4 Sheets-Sheet 1

INVENTOR.
LEROY W. VINAL
BY
Charles R. Fay,
ATTORNEY

Feb. 28, 1956 L. W. VINAL 2,736,609
BRISTLE FEEDING AND CUTTING MACHINE
Filed Oct. 4, 1950 4 Sheets-Sheet 2

INVENTOR.
LEROY W. VINAL
BY
Charles R. Fay
ATTORNEY

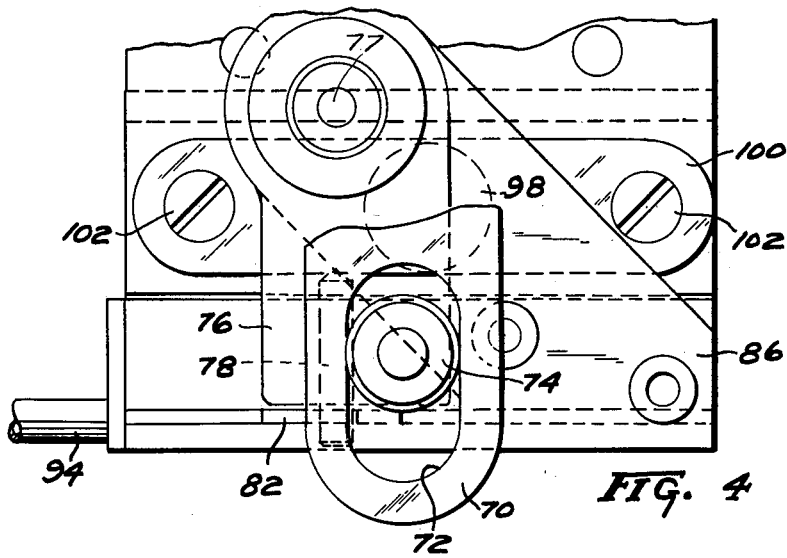
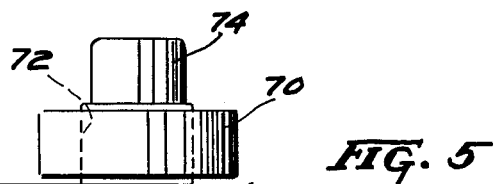
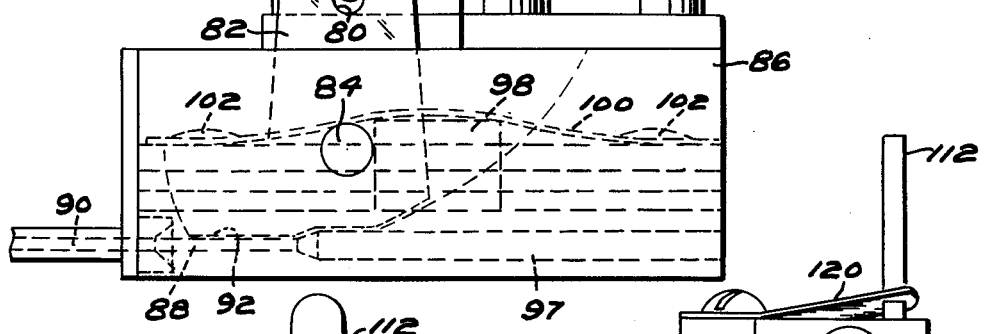
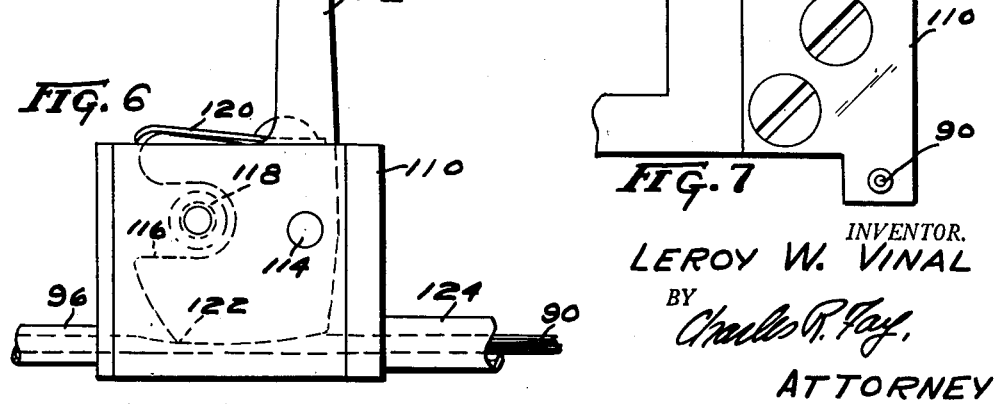

Feb. 28, 1956  L. W. VINAL  2,736,609
BRISTLE FEEDING AND CUTTING MACHINE
Filed Oct. 4, 1950  4 Sheets-Sheet 4

INVENTOR.
LEROY W. VINAL
BY
Charles R. Fay,
ATTORNEY

United States Patent Office 2,736,609
Patented Feb. 28, 1956

2,736,609

BRISTLE FEEDING AND CUTTING MACHINE

Leroy W. Vinal, Leominster, Mass., assignor to E. I. du Pont de Nemours & Company, Wilmington, Del., a corporation of Delaware Application October 4, 1950, Serial No. 188,440

10 Claims. (Cl. 300—2)

This invention relates to apparatus for feeding and cutting off lengths of filament or filaments used particularly in bristling tooth brushes but not limited to such brushes, this invention finding use wherever desired or convenient without departing from the scope thereof.

In the bristling of brushes, particularly tooth brushes, it is necessary to make the bristles of non-uniform lengths in order to provide any desired outline at the ends of the brustles forming the brushing surface. That is, as is well known, modern tooth brushes assume many different outlines as to the brushing surfaces thereof at the ends of the tufts of bristles. Some tooth brushes have a concave configuration in order to conform in general to the labial aspect of the teeth, and other tooth brushes are convex to follow the lingual aspect thereof; furthermore, the bristled portions of most tooth brushes are curved, and if a level brushing surface is desired, then the tufts of the bristles must gradually lengthen from the ends toward the center in order to achieve a level brushing surface. There are other shapes and conditions not mentioned here but which are well known to those skilled in the art.

It is the principal object of the present invention to provide fully automatically the varying bristle tuft lengths required in any brush; further, it is an object of this invention to provide such unequal lengths of tuft in a relatively simple and trouble-free mechanism which, while somewhat complicated in some respects due to the end result required, will still operate efficiently and exactly, without breakdown or undue attention required.

To this end, another object of the invention resides in the provision of a more accurate cam-controlled feeding means for the filaments going to make up the bristle tufts, in combination with a novel cutting means positively actuated and having means to hold, in part, the cut tuft as the same is anchored in the brush back so as to prevent flaring out of the cut ends as the anchors are applied.

Still a further object of the invention resides in the provision of feeding means which, while accurately feeding the filaments to the varied lengths required prior to cutting, and maintaining the center of each cut length over the anchoring die, at the same time maintains the filaments in guided substantially housed form in a passage so as to completely avoid any whipping or sagging of the filaments, these defects being apt to result in jamming of the machine and inaccuracies in the tuft lengths and being completely avoided by the present apparatus.

A further object of the invention resides in the combination and arrangement of a novel compound cam-controlled linkage which is used to feed the filaments in the varying lengths required and in other combinations and arrangements as will be made more apparent hereinafter.

Other objects and advantages of the invention will appear hereinafter.

Reference is to be had to the accompanying drawings in which

Fig. 4 is a plan view of a part of the feeding mechanism for the filament, on an enlarged scale;

Fig. 5 is a front elevation of the device of Fig. 4;

Fig. 6 is a front elevation of an anti-kickback device for the filament;

Fig. 7 is a side elevation thereof;

Figure 10:
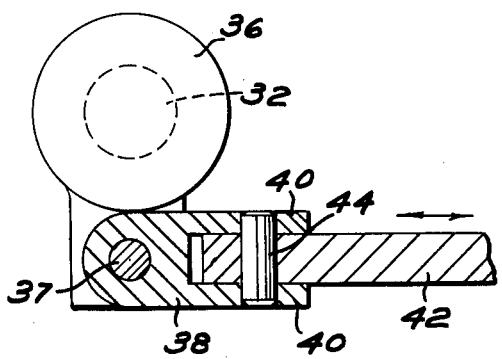
Fig. 10 is a view in elevation on an enlarged scale showing a detail of the linkage and looking in the direction of the arrow 10 in Fig. 1.
Figure 11:
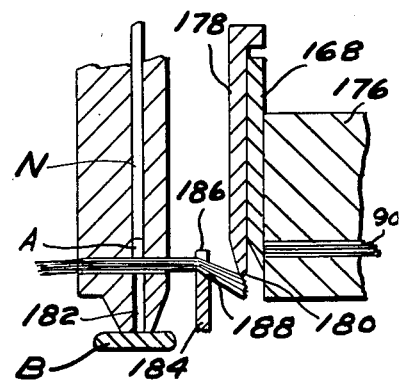
Fig. 11 is a view in front elevation of the cutting knife and tuft end holding device, parts being in section.

This apparatus is provided with a base or other support 10 upon which is a pillow block 12 mounting a bearing 16 and secured to base 10 as by bolts 18. The bearing 16 houses and journals a rotary shaft 20 which may be driven in any way convenient, as for instance by a pulley or the like 22. The shaft 20 has secured thereto for rotation therewith a cam plate 24 which is provided with a cam track 26 on its face. This cam track moves a follower 28 mounted on the end of a lever 30 and the operation of the cam is to oscillate the lever which therefore in turn oscillates a shaft 32 which is enclosed and journalled in a cylindrical housing or bearing 34. The latter is stationary and may be supported by a bracket 35 or the like. The shaft 32 therefore oscillates therewithin, transferring the vertical stroke of lever 30 to the opposite end of shaft 32 to a cap or the like element 36. This cap, of course, oscillates with shaft 32 (see particularly Fig. 10).

Depending from cap 36 there is a boss carrying a stud 37 mounting a strap, clevis or the like 38 having a pair of arms 40 embracing a link 42 pivoted therebetween on a pin 44 transversely arranged relative to stud 37, forming in effect a universal joint. As thus far described, the link 42 will be oscillated to a relatively small degree in the direction of the arrows A in Fig. 1, but link 42 is free to pivot in a substantially horizontal plane.

Link 42 is connected at its free end with a clevis or the like 46 by means of a pin 48, and this clevis is provided with another pin at right angles thereto as at 50 forming a universal joint. Pin 50 is connected at one end to a lever 52 having a fixed pivot 54 intermediate the ends thereof. At its other end, the lever 52 is provided with a pivotpin 56 connected to a link 58 in turn connected by a pin 60 to a link 62. The effect of this mechanism is to oscillate or reciprocate link 62 according to arrows B, although this motion is indeterminate in the absence of a means to constrain the movement of pivot 60, as will be described.

The link 62 is connected at its free end by a pin 64 to a bell crank 66 having a pivot 68. The arm 70 of the bell crank 66 is slotted longitudinally as at 72 and receives a pin therein as at 74.

Figure 3:
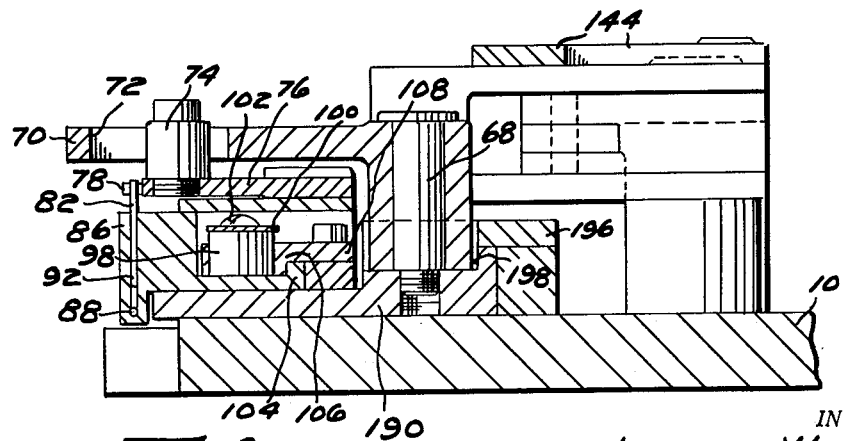
Fig. 3 is an enlarged section on line 3—3 of Fig. 1.

Pin 74 is connected to a block 76 pivoted at 77, Fig. 4, in which is mounted a horizontal pin 78. This pin extends slightly forwardly of the block 76 (see Figs. 3 and 4) and engages in a notch or slot 80 in a feeder member or dog 82 pivoted at 84 to a sliding filament feeding block 86. As the arm 70 of the bell crank 66 oscillates, the pin 74 is caused to move rectilinearly thereby carrying therewith block 76 and pin 78. The dog member 82 is thus caused to be oscillated about its pivot 84, Fig. 5, causing the block 86 to reciprocate.

Figure 1:
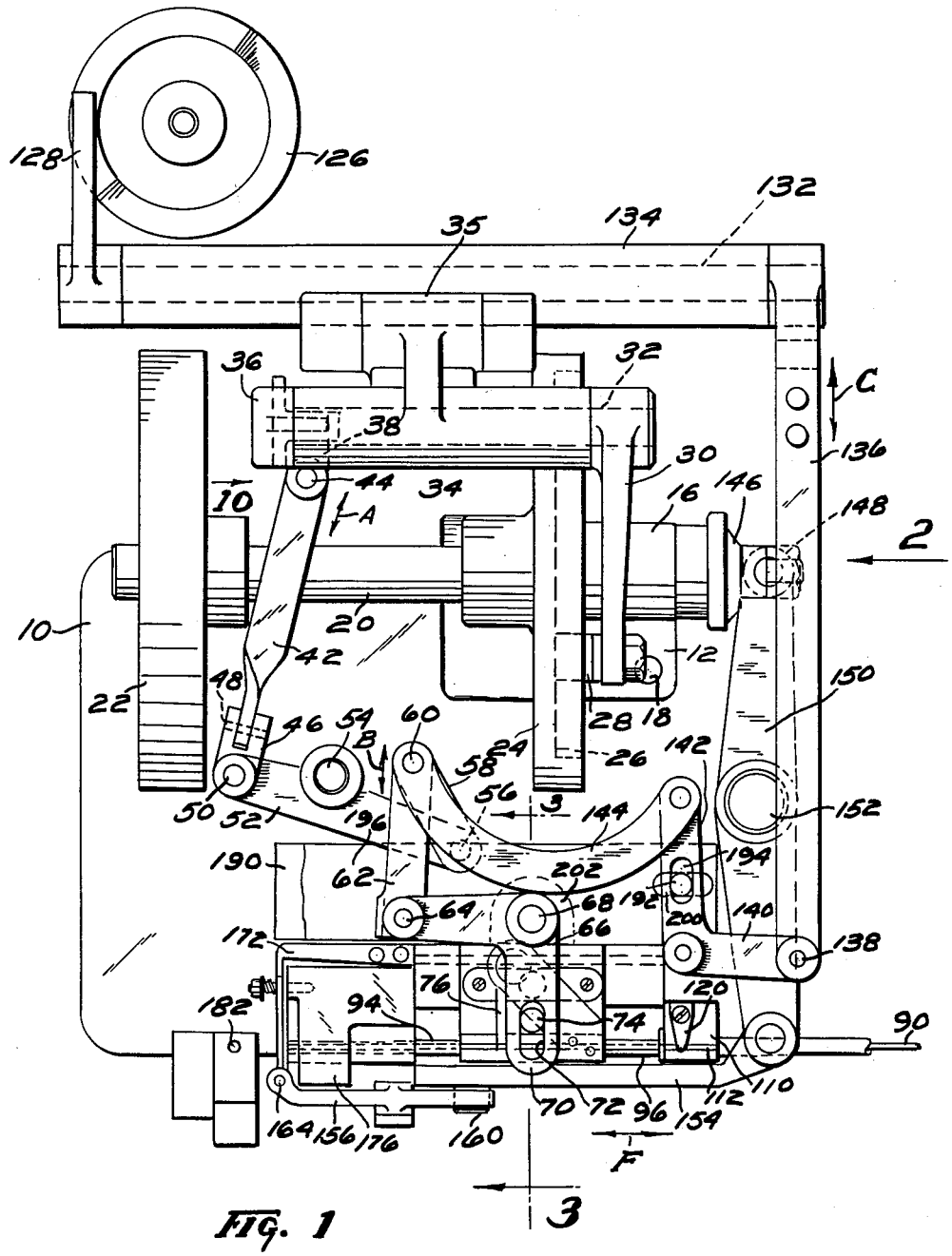
Fig. 1 is a plan view of the apparatus as a whole and illustrating the cams and linkages for the filament feed.
Figure 2:
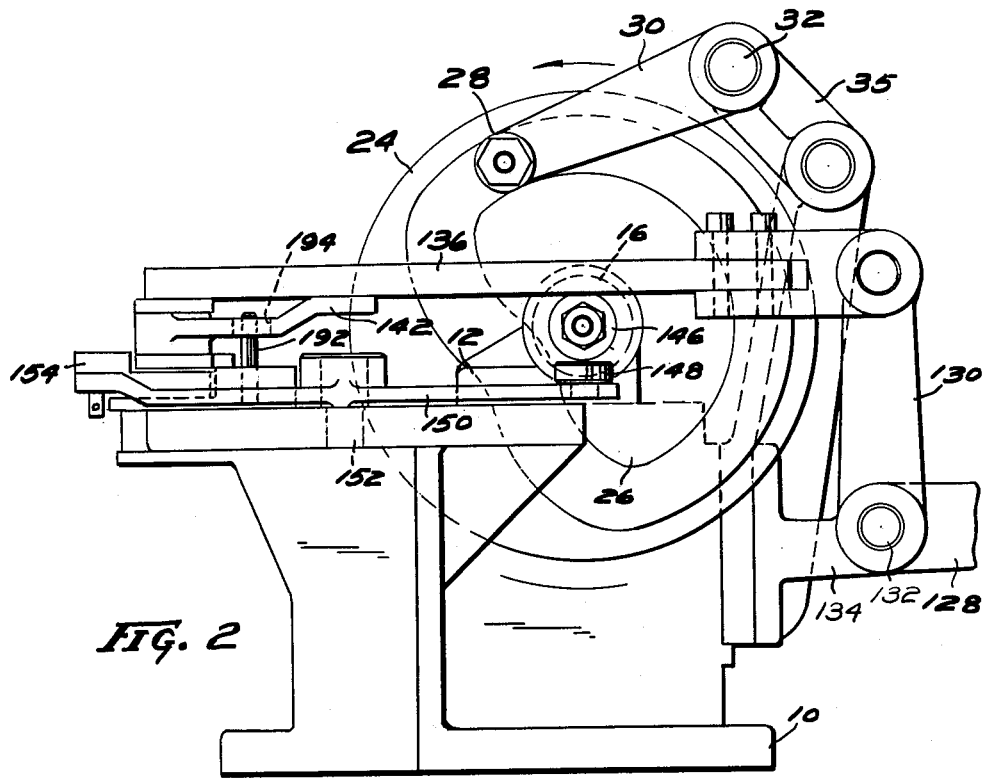
Fig. 2 is a view in side elevation of the apparatus of Fig. 1, looking in the direction of the arrow 2 in that figure.

The block 86 is provided at its lower portion with a bore 88 through which the filament 90 progresses from right to left, Figs. 1 and 4. Looking at Figs. 4 and 5, as the pin 74 moves to the left, the dog 82 is therefore oscillated counterclockwise so that a feeding foot 92 thereon moves down into passage 88 (see also Fig. 3) to grip the filament at the start of the leftward motion of the feeding block 86. Continued motion to the left feeds the filament. At the end of the stroke, and reversely to the right, the feeding dog is, of course, released from the filament by being moved clockwise and, therefore, the feeding block may move back adjacent its original position to once more feed the filament to the left. In this connection, tube 94 may be provided to maintain the filament in housed condition even though the feeding block is moving, and a tube 96 on a device to be described may telescope into the enlarged part 97 of bore 88, and thus the filament is continuously housed and maintained in a straight line so that it cannot whip nor sag.

The feeding block 86 is provided with a friction device 98 to prevent slipping or unwanted motion due to inertia. This friction also indirectly furnishes the clamping force on the bristle. The device is a friction block held down by a spring 100 stretching thereover, the ends of the spring being secured by fasteners 102 which are adjustable to vary the degree of friction imparted. The block 86 is provided with a rearwardly extending guide flange 104 guided by a cooperating shoulder at 106 on a member 108 which is relatively fixed and which supports the spring for the friction device just described.

At 110 there is provided an anti-kickback device as shown in Figs. 6 and 7 to prevent the filament from buckling and this device comprises a pivot member having a handle 112 by which it may be freed by the operator if desired. This member is pivoted at 114 and is notched at 116 at its trailing edge, there being a stop 118 in the notch preventing excess motion thereof. A leaf spring 120 bears down upon the dog to tend to maintain the same in engagement with the filament 90. The latter may be drawn along to the left in Fig. 6 but not to the right due to the conformation of the bottom edge of the dog as at 122. A tube 124 may also be used here to house the filament and protect it.

As thus far described, the filament 90 will be fed to the left in Figs. 1, 4 and 5 in equal steps, and the means used to vary the lengths of these steps resides in the provision of an open rotary cam 126 having a cam follower 128 which is caused to rise and fall by reason of the cam. The follower 128 transfers its motion to an upright lever 130 through the intermediary of a shaft 132 in a housing 134. The shaft 132 is thereby oscillated to horizontally reciprocate the forwardly extending link 136 in the direction of arrows C in Fig. 1.

The forward end of the link 136 is secured by a pin 138 to a bell crank 140 having an arm 142 connected to an arcuate link 144, the free end of which is secured to the pin 60.

It will be seen that the motion of pin 60 is thereby restricted to an arcuate path determined by the cam 126, and since pivot 60 moves, the degree of oscillation of the bell crank 70 is varied thereby through link 62. This construction thereby causes seriatim variations in the length of travel of the feeding block 86, and on the shape of cam 126 depends the different lengths of the filament feed. The links, pivot pins, levers, etc., are so arranged that, regardless of length of stroke, the block 86 always starts its stroke at the right at the same point.

Figure 8:
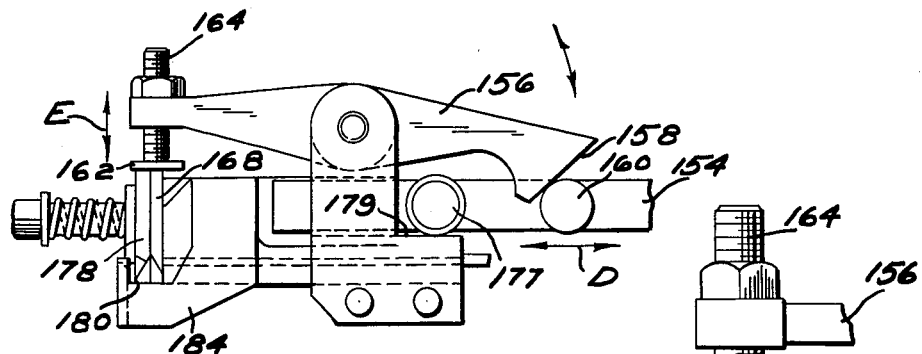
Fig. 8 is a front elevational view on an enlarged scale of the filament cut-off knife and its actuating mechanism.
Figure 9:
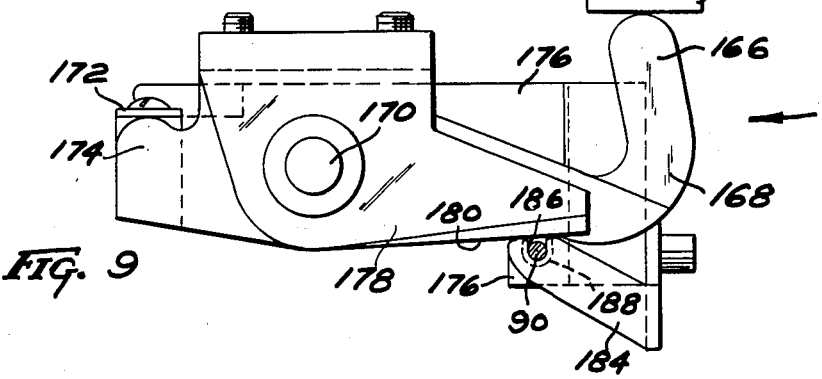
Fig. 9 is a view in side elevation thereof.

A cutting mechanism is provided for cutting the different lengths of filament off. At the extreme righthand end of shaft 20 there is an open cam 146 having a cam follower 148 connected to a pivot lever 150, said lever being pivoted intermediate its ends as at 152 and reciprocating horizontally and inter-pivoted link 154. Reciprocation of this link raises and lowers a pivoted lever 156 (see Fig. 8) through the intermediary of cam surface 158 and a roll 160 mounted on the link 154. In Fig. 8 the link 154 reciprocates according to arrow D and the lever 156 is provided with an anvil 162 which is reciprocated vertically according to arrows E through the intermediary of an adjustable pin 164.

The anvil 162 will be seen to thrust down on the upturned end 166 of a knife blade 168 which is pivoted at 170 to the base, and is provided with a return spring 172 bearing upon the knife blade at 174 at the opposite side of the pivot 170. The filament 90 is shown issuing through the knife block 176, being housed therein for rectilinear motion, and as the knife 168 descends, the filament is cut off. Roll 177 provides a bearing point for lever 154 on a flat bearing surface 179.

The anchoring of the bristle tufts, of course, immediately follows and this is generally well known to those familiar with the art. A plate 178 is secured to the knife blade 168 and is provided with a rounded non-cutting edge 180 and this edge tends to hold the cut filaments and prevent the same from spreading as the anchoring needle at N descends and doubles the tuft, as for instance, at point 182 (see Fig. 1), wherein is represented the die for doubling and setting the bristle tufts.

Block 176 carries a rearwardly extending bracket 184 having a notch 186 supporting the issuing filament and cut bristle. The slot 186 has a bevel 188, and as slight pressure is exerted on the cut bristle end by the plate 178, the edge of the slot 186 acts as a fulcrum and lifts the left end of the cut bristle to hold lightly an anchor A against the lower end of descending needle N just prior to doubling the tuft in die 182 and punching the center of the tuft and the anchor into the brush blank B. This eliminates any possible unruly action of the tuft while the anchor is coming in contact therewith.

A plate 190 (see Fig. 3) is slidable rectilinearly horizontally toward and from the die 182 in order that the latter may always represent the center of the cut off length of filament, i. e., the tuft before folding, since clearly the anchoring needle must always double over the length of filament to form the tuft. This is accomplished by means of a stud 192 in plate 190 which is received in a slot 194 in the arm 142 of the bell crank 140, and it will be seen that as this bell crank is oscillated, the plate 190 carrying with it the entire feeding and cutting mechanism, must reciprocate back and forth according to the arrows F in Fig. 1, thereby correctly placing the feeding device so as to present the cut off length of filament no matter what that length is with its exact center over the die 182 which is fixed. This variation of position of the feed plate is proportional to the motion of lever 136 and therefore of cam 126.

Supposing the length of filament cut increases to form a longer tuft when anchored, the plate 190 moves to the right to position the center of such longer length of filament at the point of center of the previous shorter length of filament.

The feeding plate, etc., is carried on plate 190; stud or pin 68 is mounted on plate 190 and moves therewith, and of course, plates 76 and 86 move relative to plate 190 and on the latter therewith, thus giving the compound motion required.

The reference 196 indicates a cover which is fixed and forms at 198 a guide and hold-down for plate 190. This cover has slots 200 and 202 to accommodate the lateral reciprocation of the stud 192 and pin 68.

It will be seen that this invention provides apparatus carrying out all the objects thereof and exactly maintains the lengths of tufts in the order desired as set up by the cams. The filament is housed, guided, and protected substantially all the time during its feed, and it cannot cause malfunction due to whipping, etc.

Having thus described my invention and the advantages thereof, I do not wish to be limited to the details herein disclosed otherwise than as set forth in the claims, but what I claim is:

1. Apparatus of the class described comprising a generally reciprocatory member, a filamentous material feed device movable therewith, means to reciprocate the feed device relative to the member, means to reciprocate the member, means controlling the reciprocating means of both member and device to feed the material in unequal steps and to constantly center the fed lengths of the material, the feed device reciprocating means including a pivoted lever having a movable pivot point, means to move the lever to operate the feed device, and means to move the pivot point in a predetermined sequence.

2. Apparatus of the class described comprising a generally reciprocatory member, a filamentous material feed device movable therewith, means to reciprocate the feed device relative to the member, means to reciprocate the member, means controlling the reciprocating means of both member and device to feed the material in unequal steps and to constantly center the fed lengths of the material, the feed device reciprocating means including a pivoted lever having a movable pivot point, means to move the lever to operate the feed device, means to move the pivot point in a predetermined sequence, the last named means comprising a lever, a connection between said latter lever and the reciprocatory member, said latter lever moving the member in certain predetermined proportion to the movement of the movable pivot for the first lever.

3. Apparatus of the class described comprising a filamentous material feeding device, a lever having a relatively fixed pivot to reciprocate the device, means to oscillate the lever to varying degrees for unequal steps of material feed, means to reciprocate the lever and the pivot bodily, and means sychronizing the oscillatory and bodily reciprocatory motions of the lever to feed unequal lengths of material constantly related to a fixed point.

4. Apparatus of the class described comprising a feed device, a lever to reciprocate the device to feed material in steps, means to operate the lever in oscillations of unequal lengths, means to reciprocate the lever bodily in the general direction of the material feed to unequal degrees, and cams controlling the lever oscillating and reciprocating means to relate the unequal lengths of fed material to a constant point.

5. Feeding means for a filamentous material comprising a lever having a fixed pivot, a link pivoted to the lever, a second link connected to the first link, a second lever pivoted by the second link, a third lever, separate oscillating means for the first and third levers, a link pivoted to the latter, a connection between the last named link and the first and second links, and a rectilinear feed block reciprocated by the second lever and having a variable reciprocatory movement under influence by both the first and third levers.

6. Feeding means for a filamentous material comprising a lever having a fixed pivot, a link pivoted to the lever, a second link connected to the first link, a second lever pivoted by the second link, a third lever, separate oscillating means for the first and third levers, a link pivoted to the latter, a connection between the last named link and the first and second links, a movable support for the pivot of the second lever, means moving the support from the third lever, and feed means on the movable support.

7. Feeding means for a filamentous material comprising a lever having a fixed pivot, a link pivoted to the lever, a second link connected to the first link, a second lever pivoted by the second link, a pivot for the second lever, a third lever, separate cams forming oscillating means for the first and third levers, a link pivoted to the latter, a connection between the last named link and the first and second links, a movable support for the pivot of the second lever, means moving the support from the third lever, a cut-off device on the movable support, and filament feed means on the movable support.

8. Apparatus to feed filamentous material comprising a lever, means to oscillate the lever, a plate reciprocated by the lever during oscillation thereof, a pin on the plate, a filament guide, a movable dog to engage and release material in the guide, the pin engaging the dog to move the latter according to the direction of movement of the plate, and the plate moving the guide and feeding the material through the dog in material engaged relation of the same.

9. Apparatus to feed filamentous material comprising a lever, means to oscillate the lever, a plate reciprocated by the lever during oscillation thereof, a pin on the plate, a filament guide, a movable dog to engage and release material in the guide, the pin engaging the dog to move the latter according to the direction of movement of the plate, and the plate moving the guide and feeding the material through the dog in material engaged relation of the same, a second plate supporting the first named plate in slidable relation thereon, and means to move the second plate in predetermined timed relation to the oscillation of the lever.

10. The combination of a filamentous material step feed device and means to sever the lengths of filament fed thereby with means to raise the cut lengths to engage an anchor and hold the same lightly against an anchor setting needle as the latter descends to double the cut length and set and anchor the same in a brush blank, said raising means comprising an element to support the cut filaments from beneath at a point separated from the severing means and a blade engaging the cut filaments close to the severing means, the needle being more remote from the latter than the supporting element.

References Cited in the file of this patent

UNITED STATES PATENTS

| | | |
|---|---|---|
| 2,187,791 | Lipps | Jan. 23, 1940 |
| 2,291,725 | Johnson | Aug. 4, 1942 |
| 2,317,401 | Hall | Apr. 17, 1943 |
| 2,350,515 | Loungway | June 6, 1944 |